I. DRIPPS.
Railway-Car Trucks.

No. 156,455. Patented Nov. 3, 1874.

Witnesses
W. A. Dripps
G. C. Dripps

Inventor
Isaac Dripps

UNITED STATES PATENT OFFICE.

ISAAC DRIPPS, OF PHILADELPHIA, PENNSYLVANIA.

IMPROVEMENT IN RAILWAY-CAR TRUCKS.

Specification forming part of Letters Patent No. 156,455, dated November 3, 1874; application filed October 9, 1874.

*To all whom it may concern:*

Be it known that I, ISAAC DRIPPS, of Philadelphia, in the county of Philadelphia and State of Pennsylvania, have invented a new and useful Improvement in Railroad-Car Trucks; and I do hereby declare that the following is a full, clear, and exact description thereof, which will enable others skilled in the art to make and use the same, reference being had to the accompanying drawing, forming part of this specification, in which—

Figure 1:
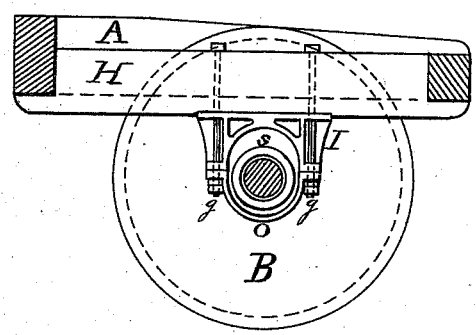
Figure 2:
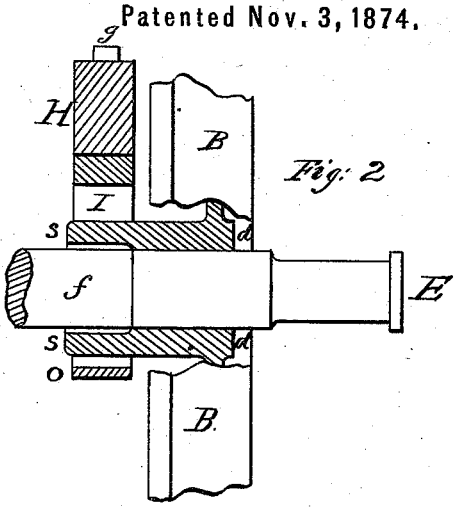
Figure 3:
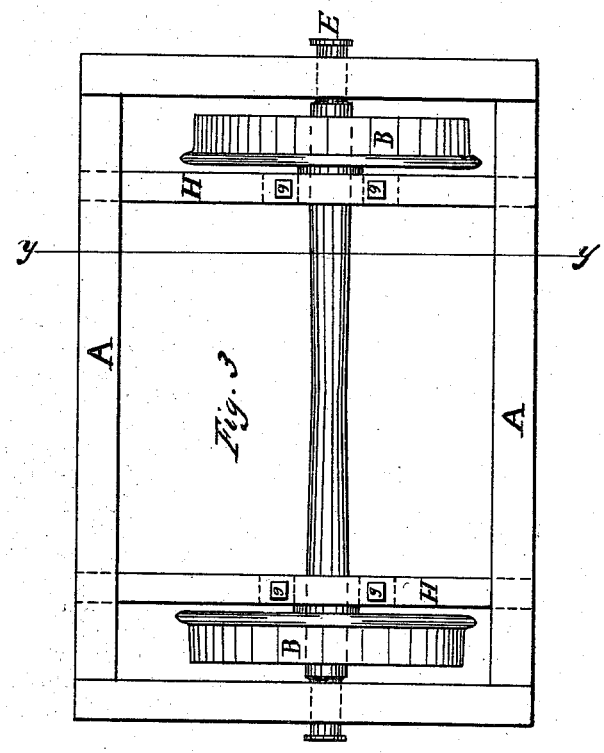
Figure 4:
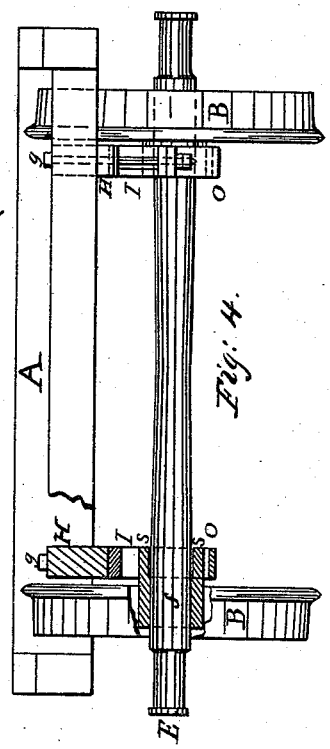

Figure 1 is a vertical section through the line $y\,y$ of Fig. 3. Fig. 2 is an enlarged view of the safety-beam of truck, with the metal frame and strap in section, also the wheel, showing the construction of the hub in section, with the axle passing through it. Fig. 3 is a top view of truck, and Fig. 4 is an end view, with the hub of one wheel, safety-beam, and metal frame, and strap in section.

The subject-matter of this invention consists in the new arrangement of the several parts of a railroad-car truck, as herein described; the object of which is to prevent accidents to life and property in case of the breaking of the truck-axles either inside of, or at the hub of, the wheel or at the journal.

To prevent accidents in case of the breaking of axles, car-trucks as now in general use are constructed with safety-beams fastened to the frame of truck, having on their under side a metal strap, which encircles the axles a little distance from the hub of the wheels. This arrangement is of but little or no use for the purpose for which it was designed, as it does not give the protection required, for the reason that, in case of an axle breaking, where they usually do, at the shoulder of the axle, just inside of the hub of the wheel, there is nothing to prevent the wheel from leaving the axle, getting out of its place, or from being the cause of an accident.

The accompanying drawing shows a truck-frame, A, having the wheels B, axles E, safety-beam H, metal frames I, and straps O.

My improvement consists in forming upon the back end of a hub, $d$, of a wheel, B, a sleeve, $s$, by prolonging the hub a sufficient distance, so as to cover a portion of the enlarged part of an axle, E. The diameter of the opening into the sleeve $s$, which covers the enlarged part $f$ of the axle E, is made a little larger than the diameter of that part of the axle, so that the axle will pass through the sleeve $s$ without being turned off, or the sleeve bored out. It also consists in having the safety-beam H placed in such a position in frame of truck that it shall come directly over the sleeve $s$ of the wheels B, so that the metal frame I and strap O, which are securely bolted to the safety-beam H by the bolts $g\,g$, will completely encircle the sleeve $s$, or the prolonged hub of the wheel B, and not encircle a part of the axle, as is now the practice.

The effect of my improvement is that, in case of an axle breaking at the shoulder just inside of the main hub, as they usually do, it will be impossible for the wheel and axle to get out of place, as the sleeve $s$ will prevent the axle from leaving the wheel, while the metal frame I and strap O completely encircling the sleeve $s$ of the hub of the wheel B will hold the wheel, and with it the axle in place and position, and thus prevent either the wheels or axles from falling down, and be the means of causing an accidental destruction to both life and property.

I do not claim the prolonged hub or sleeve $s$ on car-wheels; neither do I claim the safety-beam H, with a metal frame and strap encircling a portion of the axle back of the hub of the wheel; but What I do claim, and desire to secure by Letters Patent, is—

The wheels of a railroad-car truck, having their hubs prolonged at their back ends, forming sleeves to cover a portion of the enlarged part of the axles, in combination with the safety-beams, having metal frames and straps bolted to the under side thereof, and coming directly over and encircling the prolonged hubs or sleeves, substantially as shown and described.

ISAAC DRIPPS.

Witnesses:
W. A. DRIPPS,
G. C. DRIPPS.